US012630285B2

(12) United States Patent
Potier et al.

(10) Patent No.: US 12,630,285 B2
(45) Date of Patent: May 19, 2026

(54) LINEAR ACTUATOR

(71) Applicant: Goodrich Actuation Systems SAS, Saint-Marcel (FR)

(72) Inventors: Karl Potier, Paris (FR); Jerome Socheleau, Vernouillet (FR)

(73) Assignee: GOODRICH ACTUATION SYSTEMS SAS, Saint-Marcel (FR)

( * ) Notice: Subject to any disclaimer, the term of this patent is extended or adjusted under 35 U.S.C. 154(b) by 0 days.

(21) Appl. No.: 19/053,468

(22) Filed: Feb. 14, 2025

(65) Prior Publication Data

US 2025/0296677 A1    Sep. 25, 2025

(30) Foreign Application Priority Data

Mar. 25, 2024    (EP) ..................................... 24305440

(51) Int. Cl.
*B64C 13/40* (2006.01)
*F15B 15/26* (2006.01)

(52) U.S. Cl.
CPC .............. *B64C 13/40* (2013.01); *F15B 15/26* (2013.01)

(58) Field of Classification Search
CPC ... B64C 13/14; B64C 13/40; F15B 2015/267; F15B 15/26
See application file for complete search history.

(56) References Cited

U.S. PATENT DOCUMENTS 2,623,502 A * 12/1952 William .................. B64C 13/00
91/369.1
2,811,136 A    10/1957 Westcott, Jr. et al.

| | | | |
|---|---|---|---|
| 4,167,891 A | 9/1979 | Kamimura | |
| 5,040,747 A | 8/1991 | Kane et al. | |
| 8,794,088 B2 | 8/2014 | Quenerch'Du et al. | |
| 8,932,176 B2 | 1/2015 | Kopecek | |
| 10,107,347 B2 * | 10/2018 | Fox ...................... F16F 15/073 | |
| 10,865,738 B2 | 12/2020 | Kopecek | |
| 11,396,933 B2 | 7/2022 | Hors et al. | |

FOREIGN PATENT DOCUMENTS

| CN | 113280017 A | 8/2021 | |
|---|---|---|---|
| CN | 113280017 B | * 10/2024 | ............ F15B 15/261 |
| FR | 3068100 B1 | 5/2020 | |
| GB | 2492178 B | 6/2013 | |
| JP | S5337281 A | 4/1978 | |

OTHER PUBLICATIONS

European Search Report for Application No. 24305440.0, mailed Sep. 16, 2024, 9 pages.

* cited by examiner

*Primary Examiner* — Abiy Teka
(74) *Attorney, Agent, or Firm* — CANTOR COLBURN LLP

(57)    ABSTRACT

A linear actuator includes a housing, a piston rod having a longitudinal axis (A-A) and at least one locking arrangement. The piston rod is axially moveable in a first direction (D1) relative to the housing to extend the piston rod and is axially moveable in a second direction (D2) relative to the housing to retract the piston rod. The piston rod is rotatable about the longitudinal axis relative to the housing between an operational state and a locking state. Each locking arrangement includes a piston rod flange extending from the piston rod and a housing flange extending from the housing. When the piston rod is in the operational state, the or each housing flange does not overlap with the or each piston rod flange so as to allow axial movement of the piston rod in the first and second directions.

14 Claims, 5 Drawing Sheets

LINEAR ACTUATOR

CROSS-REFERENCE TO RELATED APPLICATIONS

This application claims the benefit of European Patent Application No. 24305440.0 filed Mar. 25, 2024, the disclosure of which is incorporated herein by reference in its entirety.

TECHNICAL FIELD

The present disclosure is concerned with linear actuators having a movable piston rod mounted in a body.

BACKGROUND

Actuators are used in a wide variety of fields and applications for moving parts or surfaces from one position to another. Actuators are commonly used, for example, in aircraft, for moving flight control surfaces or aircraft parts, doors etc. Many types of actuator are known, including mechanical, hydraulic and electrical actuators and combinations thereof e.g. electro-hydrostatic actuators, Has. A linear actuator typically has an actuator housing, within which an actuator ram or piston rod is located for axial movement relative to the housing. The rod is moved by application of power to one end of the rod. The other end of the rod is connected to a surface or part to be moved.

In some instances, it is desirable to be able to lock linear actuators against extension or extension and retraction. For example, when flying under MMEL conditions, it is desirable to be able to lock some flight control linear actuators against extension and retraction.

There is a desire for a reliable mechanism for locking such linear actuators which does not require the use of any additional or separate parts and which is capable of withstanding high loads.

SUMMARY

According to an aspect of the disclosure, there is provided a linear actuator comprising: a housing; a piston rod having a longitudinal axis; and at least one locking arrangement, wherein the piston rod is axially moveable in a first direction relative to the housing to extend the piston rod, wherein the piston rod is axially moveable in a second direction relative to the housing to retract the piston rod, wherein the piston rod is rotatable about the longitudinal axis relative to the housing between an operational state and a locking state, wherein each locking arrangement comprises a piston rod flange extending from the piston rod and a housing flange extending from the housing, wherein when the piston rod is in the operational state, the or each housing flange does not overlap with the or each piston rod flange so as to allow axial movement of the piston rod in the first and second directions, wherein when the piston rod is in the locking state and the housing flange is positioned beyond the piston rod flange in the first direction, the housing flange of each locking arrangement at least partially overlaps with the piston rod flange of that locking arrangement so as to limit axial movement of the piston rod in the first direction.

In any example of the disclosure, the linear actuator may comprise a plurality of locking arrangements.

In any example of the disclosure, the linear actuator may comprise three or a multiple of three locking arrangements.

In any example of the disclosure, the locking arrangements may be evenly circumferentially spaced on the linear actuator.

In any example of the disclosure, the or each locking arrangement may be configured to also limit axial movement of the piston rod in the second direction when the piston rod is in the locking state and the housing flange is positioned beyond the piston rod flange in the first direction.

In any example of the disclosure, each locking arrangement may comprise either: an engagement surface on the housing, circumferentially aligned with and axially spaced from the housing flange so as to form a recess between the engagement surface and the housing flange; or an engagement surface on the piston rod, circumferentially aligned with and axially spaced from the piston rod flange so as to form a recess between the engagement surface and the piston rod flange.

In any example of the disclosure, the housing may comprise a hollow cylindrical body having an outer wall, wherein the or each locking arrangement comprises an arm extending parallel to and radially spaced from the outer wall, the housing flange extending from the arm.

In any example of the disclosure, the or each locking arrangement may comprise a piston part extending axially outwardly from the piston rod in the second direction and radially inwardly of an outer wall of the housing. The part may include the recess, the engagement surface on a first axial side of the recess and the piston rod flange on a second, opposite side thereof.

In any example of the disclosure, the or each piston rod flange may extend outwardly from the piston rod and the or each housing flange may extend inwardly from the housing; or the or each piston rod flange may extend inwardly from the piston rod and the or each housing flange may extend outwardly from the housing.

In any example of the disclosure, the or each piston rod flange and/or the or each housing flange and/or the or each engagement surface may extend approximately in a radial direction.

In any example of the disclosure, the linear actuator may comprise an indicator for indicating whether the piston rod is in the operational state or the locking state.

In any example of the disclosure, the linear actuator may be a flight control actuator, such as for example a primary flight control actuator or a secondary flight control actuator, and/or the linear actuator may be a hydraulic actuator.

In any example of the disclosure, the linear actuator may comprise: a rod end attached to the piston rod by a threaded connection; and/or a mechanism for adjusting the rotational alignment of the rod end on the piston rod to allow the rod end to accurately rotate the piston rod between the operational condition and the locking condition as required.

From a further aspect of the disclosure, an aircraft is provided, the aircraft comprising: at least one flight control surface; and a linear actuator as described in any of the above examples, wherein the piston rod is connected to the flight control surface.

From a further aspect of the disclosure, a method of locking a flight control surface of an aircraft as in the above example is provided, the method comprising: rotating the piston rod of the linear actuator from the operational state to the locking state; and if necessary, prior to rotating the piston rod, retracting the piston rod until the housing flange is positioned beyond the piston rod flange in the first direction.

BRIEF DESCRIPTION

Certain examples of the disclosure will now be described by way of example only and with reference to the accompanying drawings in which.

DETAILED DESCRIPTION

Figure 1:
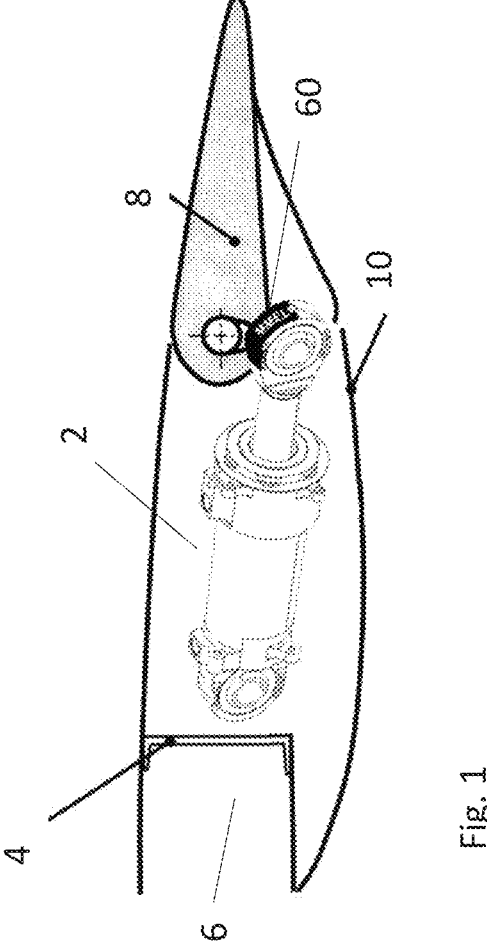
FIG. 1 is a schematic representation of an actuator according to an example of the disclosure in an unlocked state when assembled on an aircraft.
Figure 2:
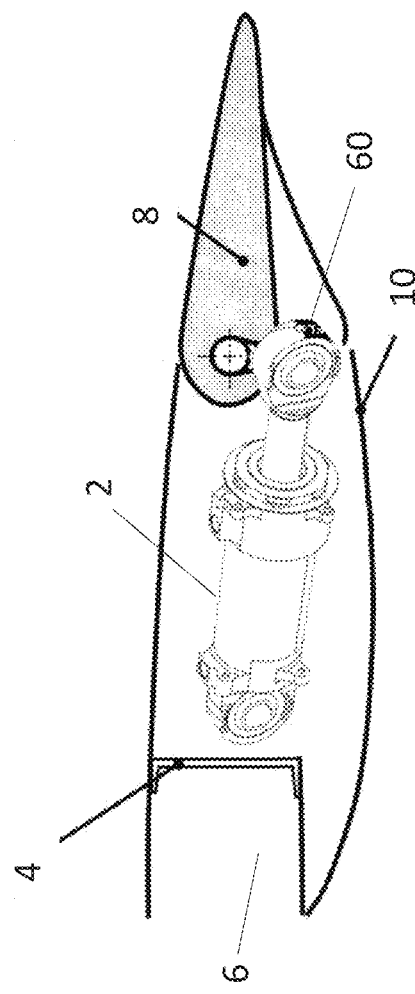
FIG. 2 is a schematic representation of an actuator according to an example of the disclosure in a locked state when assembled on an aircraft.

A linear actuator 2 is shown in FIGS. 1 and 2 for example. According to any example of the disclosure, the linear actuator may be a linear actuator for use in an aircraft (not shown). As seen in FIGS. 1 and 2, the linear actuator 2 may be a primary or secondary flight control actuator and may be mounted between a rear spar 4 on an aircraft wing box 6 and a control surface 8. The linear actuator 2 may be configured to move the control surface 8. As seen in the Figures, a fairing 10 may be provided adjacent the control surface 8. In any example, the control surface 8 could for example be a spoiler.

Figure 3A:
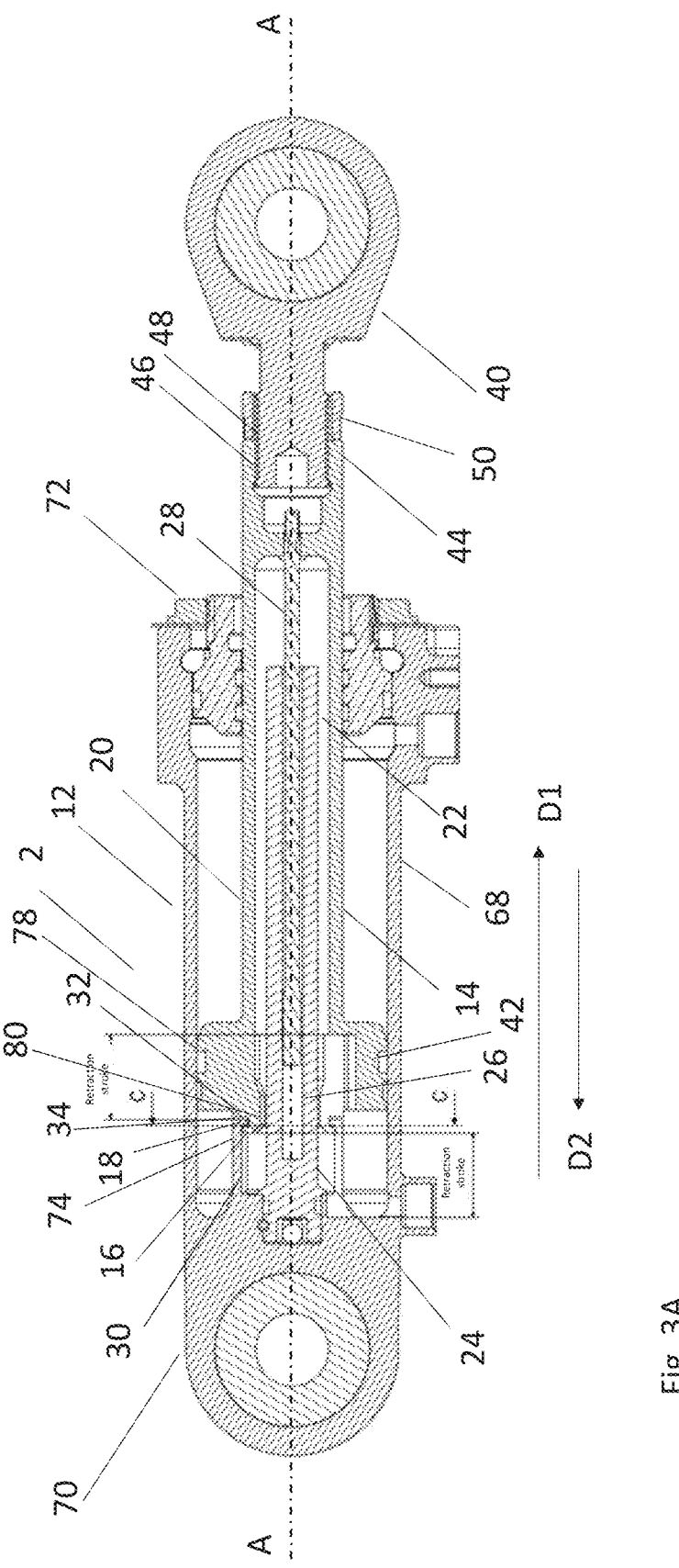
FIG. 3A shows an axial cross-section through the actuator of FIG. 2 with the actuator in the locked state.
Figure 3B:
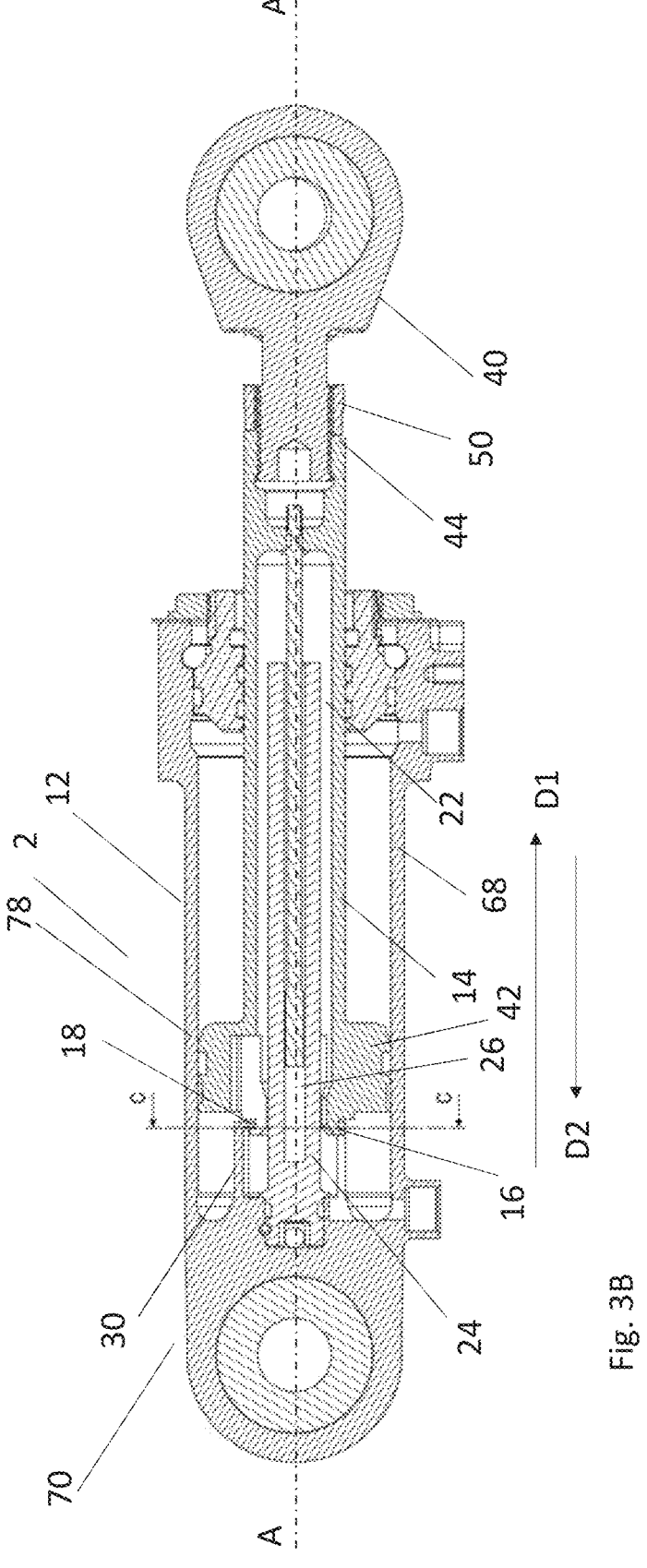
FIG. 3B shows an axial cross-section through the actuator of FIG. 2 with the actuator in the operational state.

In any example of the disclosure and as seen more clearly in FIGS. 3A and 3B, the linear actuator 2 comprises a housing 12 and a piston rod 14. The piston rod 14 is mounted in the housing 12. The piston rod 14 extends along a longitudinal axis A-A thereof and is moveable axially and/or longitudinally relative to the housing 12. The piston rod 14 may be slidably located within the housing 12. The housing 12 and/or the piston rod 14 may be cylindrical in shape. In any example, when in an operational state (as described further below) the piston rod 14 is moveable in either direction between an extended position and a retracted position. In any example, the piston rod 14 extends further beyond the housing 12 in the extended position than in the retracted position. Thus, the piston rod 14 is axially moveable in a first direction D1 relative to the housing 12 to extend the piston rod 14. The piston rod is axially moveable in a second direction D2 relative to the housing to retract the piston rod. The second direction D2 may be opposite to the first direction D1.

The linear actuator 2 may be changed between an operational condition as shown in FIG. 1, in which the linear actuator can move the control surface 8 due to extension or retraction of the piston rod 14, and a locked condition as shown in FIG. 2, in which extension of the piston rod 14 is limited (or, in some examples including the example shown both extension and retraction of the piston rod 14 are limited). It will be understood that when used in an aircraft, it may be desirable to place the actuator 2 into the locked condition, for example if the aircraft is flying under MMEL (master minimum equipment list) conditions. In such a case, when the actuator 2 is not required to be operational, there is a requirement to be able to lock the actuator such that the piston rod 14 cannot extend outwardly under the load of air acting on the control surface 8, thus holding the control surface 8 in a fixed position to avoid an unintended change in the lift acting on an aircraft wing due to movement of the control surface 8.

In any example of the disclosure, the linear actuator 2 includes at least one locking arrangement. This includes both the piston rod 14 comprises at least one piston rod flange 16 provided thereon and the housing 12 comprises at least one housing flange 18 provided thereon.

The piston rod 14 is rotatable about the longitudinal axis A-A relative to the housing 12 between an operational state and a locking state. In any example, the operational state may correspond to a first rotary position of the piston rod relative to the housing and the locking state may correspond to a second rotary position of the piston rod relative to the housing. The piston rod 14 may rotate through any angle of less than 360° when rotating between the first rotary position and the second rotary position. The first rotary position may for example be at 180° to the second rotary position.

Figure 4B:
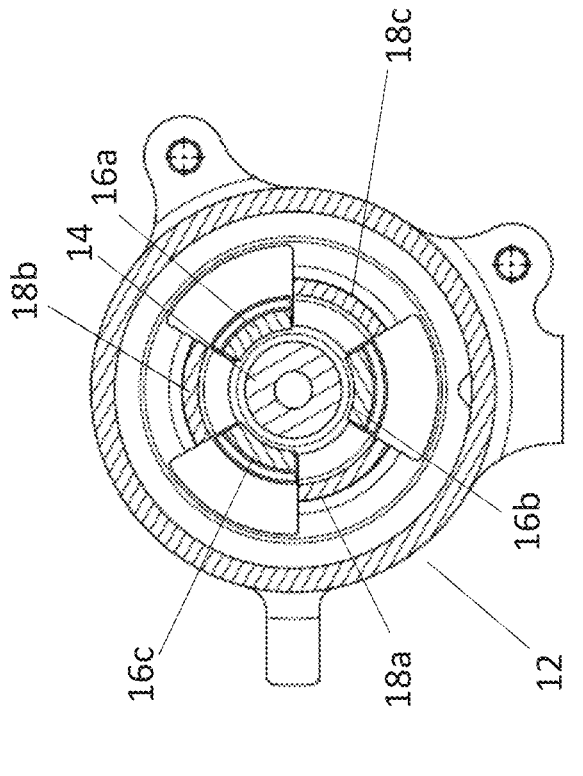
FIG. 4B is a cross section taken along line C-C of FIG. 3B.
Figure 4A:
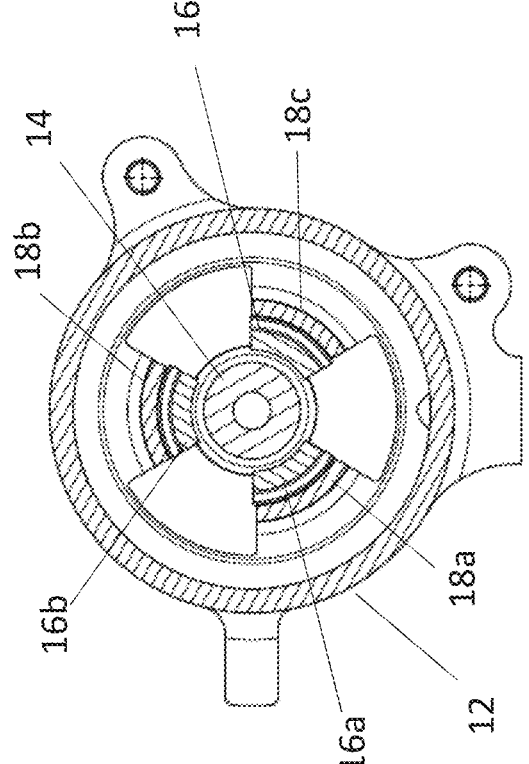
FIG. 4A is a cross section taken along line C-C of FIG. 3A.

In any example of the disclosure, when the piston rod 14 is in the operational state such that the actuator is in the operational condition, as seen for example in FIGS. 3A and 4A, the housing flange 18 does not overlap with the piston rod flange 16 so as to allow axial movement of the piston rod 14 in the first and second directions. In contrast, as seen for example in FIGS. 3B and 4B, when the piston rod 14 is in the locking state and the housing flange 18 is positioned beyond the piston rod flange 14 in the first direction D1, such that the actuator is in the locked condition, the housing flange 18 at least partially overlaps with the piston rod flange 16 so as to limit axial movement of the piston rod 14 in the first direction D1. Thus, when piston rod 14 is in the locking state and the housing flange 18 is positioned beyond the piston rod flange 14 in the first direction D1, the linear actuator is in the locked condition in which the extension of the piston rod 14 is limited by the engagement of the piston rod flange 16 against the housing flange 18. It will be understood that any load acting on the piston rod 14 in the first direction D1 in turn acts on the piston rod flange 16 and the housing flange 18. At least in some examples therefore, the piston rod flange 16 and the housing flange 18 are configured to withstand considerable loads, for example they may be configured to withstand the maximum operating load on a control surface 8 of the type described above with reference to FIGS. 1 and 2.

In any example of the disclosure, the piston rod 14 may comprise a hollow cylinder and may define a radially outer surface 20. A bore 22 is formed inside the piston rod 14, inside which a mechanism 24 for moving the piston rod 14 axially relative to the housing 12 is provided. In the example shown in FIGS. 3A and 3B, the mechanism 24 comprises an axial screw mechanism comprising an internally threaded bore 26 fixed to the housing 12 and an externally threaded screw 28, movable within the internally threaded bore 26 and fixed to the piston rod 14. It will be understood however that any other suitable mechanism could be provided.

In any example of the disclosure, the radially outer surface 20 defines a circumferential extent of the piston rod 14. In any example of the disclosure, the piston rod flange 16 extends over only part of the circumferential extent of the piston rod 14. In any example of the disclosure, the housing 12 may be cylindrical and an inner surface 30 of the housing 12 defines a housing circumferential extent. In any example of the disclosure, the housing flange 18 extends over only part of the housing circumferential extent. In any example of the disclosure, the or each of the housing flange(s) and the piston rod flange(s) may be circumferentially aligned with each other when the piston rod 14 is in the locking state.

In some examples of the disclosure, it may be desirable to limit movement of the piston rod 14 in both the first and second direction D1, D2 when the actuator is in the locked condition. In such examples, an engagement surface may be provided on the housing or the piston rod which is circumferentially aligned with and axially spaced from the housing flange 18 (when part of the housing) or the piston rod flange 16 (when part of the piston rod) so as to form a recess or cavity between the engagement surface and the housing flange 18 or between the engagement surface and the piston rod flange 16. It will be understood that when the actuator is in the locked condition, the other of the housing flange or piston flange will be aligned with (for example circumferentially aligned with and/or radially overlapping with) and axially between the engagement surface and the housing flange 18 or between the engagement surface and the piston rod flange 16 so as to be received within the recess or cavity.

One such arrangement is shown in the example of FIGS. 3A to 4B. In this example as shown, the piston rod 14 comprises a piston rod flange 16 which extends radially outwardly from the piston rod 14 and an engagement surface 32 which extends radially outwardly from the piston rod 14 and is axially spaced from the piston rod flange 16 in the first direction D1 so as to form a recess 34 between the piston rod flange 16 and the engagement surface 32. In this set of examples, it will be appreciated that movement of the piston rod in the second direction D2 will also be limited when the actuator is in the locked condition due to the engagement surface 32 limiting the axial movement of the housing flange 16.

In any example of the disclosure, the piston rod flange 16 may extend outwardly from the piston rod 14 (in other words away from the longitudinal axis A-A) and the housing flange 18 may extend inwardly from the housing 12 (in other words towards the longitudinal axis A-A). In the alternative, in any example of the disclosure, the piston rod flange 16 may extend inwardly from the piston rod 14 (in other words towards the longitudinal axis A-A) and the housing flange 18 may extend outwardly from the housing 12 (in other words away from the longitudinal axis A-A), for example when the housing or a part of the housing 12 on which the housing flange 18 is provided is located radially inwardly of the piston rod 14. In any example of the disclosure, the piston rod flange 16 and/or the housing flange 18 and/or the engagement surface may extend at an angle of between 45° and 90° to the longitudinal axis A-A. In any example of the disclosure, the piston rod flange 16 and/or the housing flange 18 and/or the engagement surface may extend approximately in a radial direction, for example at an angle of between 70° and 90° to the longitudinal axis A-A, where the radial direction is at 90° to the longitudinal axis A-A. In any example of the disclosure, the piston rod flange 16 and the housing flange 18 and/or the engagement surface may extend at the same or within 10° of the same angle to the longitudinal axis A-A.

As described above, the linear actuator 2 comprises at least one locking arrangement comprising a piston rod flange 16, a housing flange 18 and, in some examples an engagement surface. In any example of the disclosure, the linear actuator 2 may comprise two or more locking arrangements. In any example of the disclosure, the linear actuator 2 may comprise three or more locking arrangements. This configuration may provide a strong arrangement for sustaining maximum operating load and may be well balanced. It will further be advantageous in some situations where the piston rod is configured to be rotated by 180° to change the linear actuator from the operational condition to the locked condition.

In any example of the disclosure, the linear actuator 2 may comprise three or a multiple of three locking arrangements. In any example of the disclosure, the locking arrangements and/or the respective housing flanges, piston rod flanges and/or engagement surfaces may be evenly circumferentially spaced around the piston rod and the housing of the linear actuator. Each locking arrangement may be circumferentially spaced from a circumferentially adjacent locking arrangement. Thus, a gap may be formed between a respective housing flange, piston rod flange and/or engagement surface and a respective circumferentially adjacent housing flange, piston rod flange and/or engagement surface.

In any example of the disclosure, and as seen in FIGS. 4A and 4B, the linear actuator may comprise three locking arrangements. Each of the three locking arrangements may extend around one sixth of the circumference of the piston rod and the housing. FIG. 4A is a section along line C-C of FIG. 3A, showing the linear actuator 2 in the locked condition. In this condition each of the three housing flanges 18a, 18b, 18c is rotationally aligned with and overlaps its respective piston rod flange 16a, 16b, 16c. In contrast to this and as seen in FIG. 4B, which is a section along line C-C of FIG. 3B, showing the linear actuator 2 in the operational condition, in this example, the piston rod 14 has been rotated through approximately 180° such that none the three housing flanges 18a, 18b, 18c is rotationally aligned with its respective piston rod flange 16a, 16b, 16c.

In any example of the disclosure, the linear actuator 2 may include a rod end 40 configured to be directly or indirectly attached to a moveable component such as, for example, the control surface 8 of the example of FIGS. 1 and 2. The piston rod 14 has a first end portion 42 on which the one or more locking arrangements are provided. The piston rod 14 has a second end portion 44 axially spaced from first end portion 42 in the first direction D1. The second end portion 44 is a hollow cylindrical portion with a threaded radially inner surface 46. The rod end 40 is attached to the piston rod 14 by screwing the rod end 40 into the second end portion 44 such that a radially outer threaded surface 48 of the rod end 40 engages with the threaded radially inner surface 46. A nut 50 is provided on the radially outer threaded surface 48 of the rod end 40 to set the rotation of the piston rod relative to the rod end 40 such that the rotational alignment of the piston rod 14 relative to the housing 12 may be set at a desired alignment to allow the rod end 40 to accurately rotate the piston rod 14 between the operational condition and the locking condition as required.

In any example of the disclosure and as seen in FIGS. 1 and 2, an indicator 60 may be provided on the rod end 40. In this and other examples, the indicator 60 may be a differently coloured part on the outer circumference of the rod end 40 which will be visible to a user (for example maintenance personnel) and in a first orientation when the linear actuator is in the locked condition but will rotate with the rod end 40 to be in a second orientation and, in some examples, consequently not be visible to a user when the linear actuator is in the operating condition. In the example shown in FIGS. 1 and 2, the indicator 60 is positioned so as to be visible to maintenance personnel from underneath the aircraft wing when the linear actuator is in the locked condition. In other examples, the indicator could be positioned to be visible from a different angle if desired. Further, in the example shown and other examples as desired, the indicator 60 includes a red portion which will be clearly visible and easily distinguishable by maintenance personnel. It will be understood that other colours such as yellow which provide similar advantages could be used additionally or alternatively. Further, in the example shown and other examples as desired, the indicator 60 includes the lettering "MMEL" to indicate to the user that the actuator is locked in the MMEL condition. It will be understood that other lettering or wording could be used as desired. It will be understood that other indicators could be provided in addition to or instead of the indicator described. In one example, the indicator could comprise a marker on the piston rod 14 positioned so as to be visibly aligned with a marker on an external surface of the body when the linear actuator is in the locked condition or, in another example, when the linear actuator is in the operating condition.

In any example of the disclosure, including that shown in the drawings, the housing 12 which comprises a hollow cylindrical body as described above may include any of an outer wall 68, a solid end portion 70 at a first end thereof and an open end including a closing member 72 at the other end thereof through which the piston rod 14 extends. The housing 12 may also comprise an arm 74 extending parallel to and radially spaced from the outer wall 68. The arm 74 may form part of the locking arrangement such that a respective arm is provided in each locking arrangement. The arm extends outwardly from the solid end portion 70 in the first direction D1 and the housing flange 18 extends radially inwardly from the far end of the arm 74.

The piston rod 14 has a first end portion 42 on which the one or more locking arrangements are provided as described above. The first end portion 42 extends radially outward beyond the outer circumference of the remainder of the piston rod 14. As seen in FIGS. 3A and 3B, the radially outer surface 78 of the first end portion 42 at least partially engages with the outer wall 68 of the housing 12 so as to guide movement of the piston rod 14 in the housing 12. Each locking arrangement includes a piston part 80 extending axially outwardly from the first end portion 42 in the second direction D2 and positioned radially inward of the outer wall 68. The piston part forms or includes the recess 34, the engagement surface 32 on a first axial side thereof and the piston rod flange 16 on a second, opposite side thereof. The linear actuator, including the piston part 80 is configured such that the housing flange 18 of each locking arrangement may rotate into or out of engagement with its respective recess 34 as the piston rod 14 is rotated through a desired angle (1800 in the examples shown).

The linear actuator may for example be a hydraulic linear actuator. The piston rod 6 may move relative to the housing 4 responsive to the application of hydraulic fluid. It will be understood however that the disclosure is also applicable to other types of actuator including for example electromechanical linear actuators.

In any example of the disclosure, the piston rod and/or the housing may be formed from any suitable metal including steel. Any components of the locking arrangement(s) may be an integral part of the piston rod, for examples being formed from a single casting with the piston rod) or the housing and may also be formed from any suitable metal including steel.

In any example of the disclosure, a linear actuator 2 according to the disclosure can be changed from the operational condition to the locked condition or from the locked condition to the operational condition merely by rotating the piston rod 14 through a required rotation, for example through 180° in the example shown in the drawings. This rotation can be carried out manually, for example by holding and rotating the rod end 40. Further, where an indicator is provided, maintenance personnel adjusting the linear actuator will be able to quickly and easily see what, if any adjustment is required. In aerospace applications this has the advantage of avoiding time consuming and potentially expensive corrections being required should an actuator being in the wrong condition (for example being in the operational condition when it should be locked) only be discovered once a pilot runs their pre take-off checks.

It will be understood that at least in some examples of the disclosure, a linear actuator according to the disclosure has the advantage of being lockable against extension or against extension and retraction of the piston rod thereof in a manner which will not allow the piston rod position to drift over time (as may be the case with some other types of linear actuator). Further, all parts of the locking arrangement are included in the linear actuator such that no additional components or spare parts need to be provided in order to lock the linear actuator against extension or extension and retraction of the piston rod.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of disclosure. Additionally, while various examples of the disclosure have been described, it is to be understood that aspects of the disclosure may include only some of the described examples. Accordingly the disclosure is not to be seen as limited by the foregoing description, but is only limited by the scope of the appended claims.

The invention claimed is:

1. A linear actuator comprising:
a housing comprising a hollow cylindrical body having an outer wall;
a piston rod having a longitudinal axis; and
at least one locking arrangement comprising an arm extending parallel to an radially from the outer wall,
wherein the piston rod is axially moveable in a first direction relative to the housing to extend the piston rod,
wherein the piston rod is axially moveable in a second direction relative to the housing to retract the piston rod,
wherein the piston rod is rotatable about the longitudinal axis relative to the housing between an operational state and a locking state,
wherein each locking arrangement comprises a piston rod flange extending from the piston rod and a housing flange extending from the arm of the locking arrangement,
wherein when the piston rod is in the operational state, each housing flange does not overlap with each piston rod flange so as to allow axial movement of the piston rod in the first and second directions,
wherein when the piston rod is in the locking state and the housing flange is positioned beyond the piston rod flange in the first direction, the housing flange of each locking arrangement at least partially overlaps with the piston rod flange of that locking arrangement so as to limit axial movement of the piston rod in the first direction.

2. The linear actuator as claimed in claim 1, comprising a plurality of locking arrangements.

3. The linear actuator as claimed in claim 1, comprising three or a multiple of three locking arrangements.

4. The linear actuator as claimed in claim 2, wherein the locking arrangements are evenly circumferentially spaced on the linear actuator.

5. The linear actuator as claimed in claim 1, wherein each locking arrangement is configured to also limit axial movement of the piston rod in the second direction when the piston rod is in the locking state and the housing flange is positioned beyond the piston rod flange in the first direction.

6. The linear actuator as claimed in claim 5, wherein each locking arrangement comprises either:

an engagement surface on the housing, circumferentially aligned with and axially spaced from the housing flange so as to form a recess between the engagement surface and the housing flange; or an engagement surface on the piston rod, circumferentially aligned with and axially spaced from the piston rod flange so as to form a recess between the engagement surface and the piston rod flange.

7. The linear actuator as claimed in claim 6, wherein the or each locking arrangement comprises a piston part extending axially outwardly from the piston rod in the second direction and radially inwardly of an outer wall of the housing, wherein the part forms the recess, the engagement surface on a first axial side of the recess and the piston rod flange on a second, opposite side thereof.

8. The linear actuator as claimed in claim 1, wherein each piston rod flange extends outwardly from the piston rod and the or each housing flange extends inwardly from the housing; or wherein each piston rod flange extends inwardly from the piston rod and the or each housing flange extends outwardly from the housing.

9. The linear actuator as claimed in claim 1, wherein each piston rod flange the or each housing flange and/or the or each engagement surface extend approximately in a radial direction.

10. The linear actuator as claimed in claim 1, comprising an indicator for indicating whether the piston rod is in the operational state or the locking state.

11. The linear actuator as claimed in claim 1, wherein the linear actuator is a flight control actuator, and/or wherein the linear actuator is a hydraulic actuator.

12. The linear actuator as claimed in claim 1, comprising:

a rod end attached to the piston rod by a threaded connection; and a mechanism for adjusting the rotational alignment of the rod end on the piston rod to allow the rod end to accurately rotate the piston rod between the operational condition and the locking condition as required.

13. An aircraft comprising:

at least one flight control surface; and a linear actuator as claimed in claim 1;

wherein the piston rod is connected to the flight control surface.

14. A method of locking a flight control surface of an aircraft as claimed in claim 13, the method comprising:

rotating the piston rod of the linear actuator from the operational state to the locking state; and prior to rotating the piston rod, retracting the piston rod until the housing flange is positioned beyond the piston rod flange in the first direction.

* * * * *